United States Patent [19]

Migliardi et al.

[11] 4,023,045
[45] May 10, 1977

[54] OMNIDIRECTIONAL ELECTRONIC PROBE FOR MEASURING MACHINES

[75] Inventors: Gianfranco Migliardi, Turin; Ugo Cavicchioli, Borgaro Torinese, both of Italy

[73] Assignee: Digital Electronic Automation, Italy

[22] Filed: Nov. 18, 1975

[21] Appl. No.: 632,949

[30] Foreign Application Priority Data

Nov. 18, 1974 Italy .................................. 70360/74
Oct. 15, 1975 Italy .................................. 69574/75

[52] U.S. Cl. .............................. 307/119; 318/578; 324/158 P
[51] Int. Cl.² .................................. H01H 35/00
[58] Field of Search ....... 200/61.41, 61.42, 61.58 R, 200/61.43, 61.44, 51.1, 47, 61.13, 61.18; 307/119; 340/246, 247, 265; 318/578; 324/158 P

[56] References Cited

UNITED STATES PATENTS

| | | | |
|---|---|---|---|
| 1,536,332 | 5/1925 | Dam | 200/51.1 |
| 3,213,225 | 10/1965 | Torres | 200/61.41 |
| 3,727,119 | 4/1973 | Stanley et al. | 318/578 |

Primary Examiner—James R. Scott
Assistant Examiner—Morris Ginsburg
Attorney, Agent, or Firm—Ladas, Parry, Von Gehr, Goldsmith & Deschamps

[57] ABSTRACT

An omnidirectional electronic probe indicating the fall out of balance position, and particularly suitable to be used in measuring machines, is described. This probe comprises a rod arranged to come into contact with a surface to be inspected, a movable body connected to the rod, and a fixed support body for the movable body; the fixed and movable bodies comprise electric contact elements which provide in combination a switch. The main feature of this probe is that the stable balance position of the movable body with respect to the fixed body is a statically determined balance position and the switch is closed exclusively for the unique stable balance position. Another feature of the probe is to be provided with miniaturized electronic circuits which prevent the transmission of erroneous signals to the machine during the phases of opening and closure of the switch.

14 Claims, 8 Drawing Figures

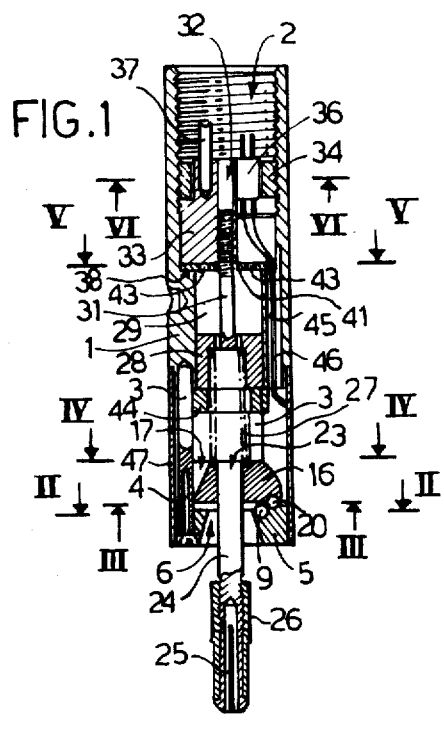
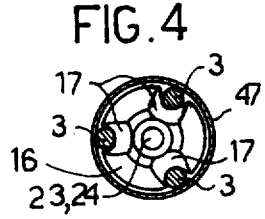
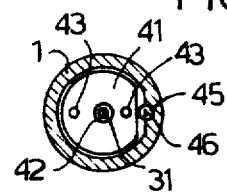
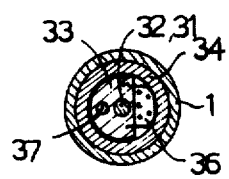

OMNIDIRECTIONAL ELECTRONIC PROBE FOR MEASURING MACHINES

BACKGROUND OF THE INVENTION

The present invention relates to an omnidirectional electronic probe indicating the fall out of balance position, particularly suitable for use in a contour measuring machine of a known type having a displaceable head to which the probe is connected. The head can be generally displaced along three orthogonal axes by suitable mechanisms in the machine, and the machine includes electric control means to which electric signals from the probe are fed.

A known probe of this type comprises substantially a pan fixed to the upper end of the rod of the probe, from which pan three pins extend outwardly, whose axes form between them angles of 120°. Said three pins terminate with their other end near insulating blocks on which, at the sides of each pin and in contact with the same, three pairs of balls are disposed. Said three pairs of balls are connected electrically in series, by means of wires, so that they, in combination with the pins, provide not only a bearing, but also a mechanically controlled switch which, owing to the contact of each pin with the adjacent balls, closes in the only one stable balance position of the rod. In fact, the contact of the rod with a surface which has to be inspected causes the rod to move from the balance position, so that in consequence of the separation of at least one pin from an adjacent ball said switch is opened and an electric signal is generated which is utilized by the measuring machine.

However, the configuration and arrangement of the aforementioned elements of the probe which form the switch are not completely satisfactory from the kinematic point of view.

Moreover, during the measuring phases some disadvantages may arise. In fact, after the probe has encountered the surface to be inspected and the switch has been opened because of the displacement of the rod, and consequently a signal has been transmitted to the measuring machine, it may sometimes arise, especially for slow measurements, after a very short time, a false closure position of the switch, with an erroneous transmission of a signal to the machine. Moreover, as the probe is brought back to a position whereby the rod returns into the balance position and the switch closes, the rod effects a plurality of damped oscillations about its balance position before being stabilized, with a sequence of closures and openings of the switch, which may, of course, transmit erroneous indications to the machine.

In consideration of the foregoing, the object of the present invention is to provide an omnidirectional electronic probe which has a new configuration and arrangement of the elements forming on the whole the switch, in order to obtain a bearing of an isostatic type, so as to avoid the aforementioned imperfections.

Another object of the present invention is to provide, for such omnidirectional electronic probe, miniaturized electronic circuits which prevent the transmission of erroneous signals to the machine during the phases of measurement, in particular during the phases of opening and closure of the switch controlled by the rod of the probe, so as to avoid the disadvantages mentioned above.

A further object of the present invention is to allow a more safe and efficient utilization of the probe on completely automatic measuring machines, i.e. by transmitting to the machine such a signal as to indicate the closure or opening position of the switch.

SUMMARY OF THE INVENTION

According to the present invention an omnidirectional electronic probe for measuring machines is provided, comprising a rod arranged to come into contact with a surface to be inspected, a movable body connected to said rod, and a fixed support body for said movable body, said fixed and movable bodies comprising electric contact elements which provide in combination a switch comprising at least one contact switch, the stable balance position of said movable body with respect to said fixed body being a statically determined balance position, without superabundant restraints, and said switch being closed exclusively for said unique stable balance position.

BRIEF DESCRIPTION OF THE DRAWINGS

For a better understanding of the present invention, an embodiment thereof will now be described by way of non limitating example with reference to the annexed drawings, in which:

FIG. 1 is a side elevational sectional view of the probe according to the present invention;

FIGS. 2, 3, 4, 5 and 6 are sectional views along the lines II—II, III—III, IV—IV, V—V and VI—VI respectively, of the probe shown in FIG. 1;

DETAILED DESCRIPTION OF THE INVENTION

Figure 7:
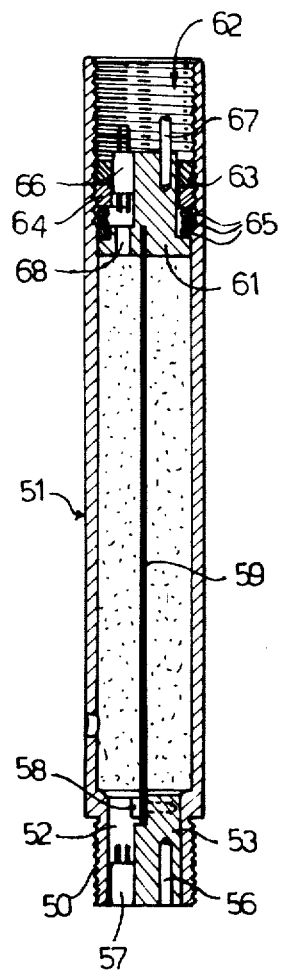
FIG. 7 is a side elevational sectional view of a rear extension of the probe of FIG. 1, containing therein the interface of electric connection to the measuring machine.

Referring to FIG. 1, the probe according to the present invention comprises a cylindrical outer body 1 having a ground surface, which body presents at its upper end a threaded opening 2, while at its lower portion there are stuck three columns 3 disposed vertically downwards and equally spaced by 120°. Connected to the lower end of the columns 3 by means of screws 4 is a fixed block 5, for example made of aluminum, which block, as can be better seen in FIG. 2, has the shape of an annular crown with a central frustoconical through hole 6 whose cross section increases progressively towards the lower end of the probe. Conveniently fixed in the upper portion of said block 5 rendered insulating by means of thickness anodization, are a plane surface block 7, a pair of balls 8 and three balls 9.

The block 7 is disposed in such a way that its upper plane surface projects above the level of the upper surface of the block 5.

The balls 8 are disposed in such a way as to emerge, substantially by the half of their cross section, from the upper surface of the block 5, and moreover they are disposed along an axis which intersects perpendicularly a plane coming out from the center of the hole 6 and disposed at 120° with respect to a plane passing through the center of the block 7.

Also the balls 9 are disposed in such a way as to emerge, substantially by half of their cross section, from the upper surface of the block 5, and are situated at the apices of an equilateral triangle, through the center of which passes a plane, coming out from the hole 6, which forms two angles of 120° with the plane passing through the center of block 7 and the plane passing at half distance between the balls 8, respectively.

Fixed to on the upper surface of the block 5 is an insulating terminal board 11 which has the same shape as the surface of the block 5, with the space for the housings of the block 7 and the balls 8 and 9.

Said terminal board 11 carries a printed circuit; in fact, disposed on it are an inlet connection 12 arranged between the outer edge and one of the balls 8, a connection 13 arranged between the other ball 8 and the block 7, and three outlet connections 14 each of which is arranged between one of the balls 9 and the outer edge of the terminal board 11.

Disposed on the fixed block 5 is a movable block 16, also made of aluminum, having approximately the shape of a portion of a spherical cap, with three oblique outer slots 17 disposed at 120° and inclined upwards, which allow the passage of the columns 3.

Conveniently fixed in the lower portion of said movable block 16, which portion also is rendered insulating for example by means of thickness anodization, are a pin 18 and two balls 19 and 20. The pin 18 is disposed in such a way as to emerge, substantially by half of its cross section, from the lower surface of the block 16, with its axis passing through the center of the lower surface of said block 16, and so as to coincide with the plane passing at half the distance between the balls 8.

The balls 19 and 20 are disposed in such a way as to emerge, substantially by half of their cross section, from the lower surface of the block 16, and their center belongs to two planes disposed at 120° to each other, passing through the center of the block 7 and through that of the equilateral triangle defined by the balls 9, respectively. Fixed to the lower surface of the block 16 is an insulating terminal board 21 which is equal in its shape to the surface of the block 16, with the space for the housings of the pin 18 and the balls 19 and 20. Also this terminal board 21 carries a printed circuit; and disposed on said terminal board is a connection 22 situated between the balls 19 and 20.

The movable block 16 is provided, in the axial direction, with a through hole 23 containing a vertical connection rod 24 which is fixed to the block 16 and comes out from the lower end of the outer body 1 by passing through the through hole 6 of the fixed block 5.

In order to allow carrying out the desired measurements, the end of a measuring rod (not shown) is connected and fixed by means of a ring nut 26, according to a well-known way of connection, to the vertical connection rod 24, which is provided with notches 25.

The upper region of the block 16 constitutes a bearing for a cylindrical spiral spring 27 whose other end rests on a cup 28 which may slide within a cylindrical seating 29. Resting on the cup 28 is one end of an adjusting screw 31 which engages in a threaded through hole 32 formed axially in a block 33 disposed within the opening 2 and locked therein by means of a threaded ring 34 screwed into the threaded opening 2.

Figure 8:
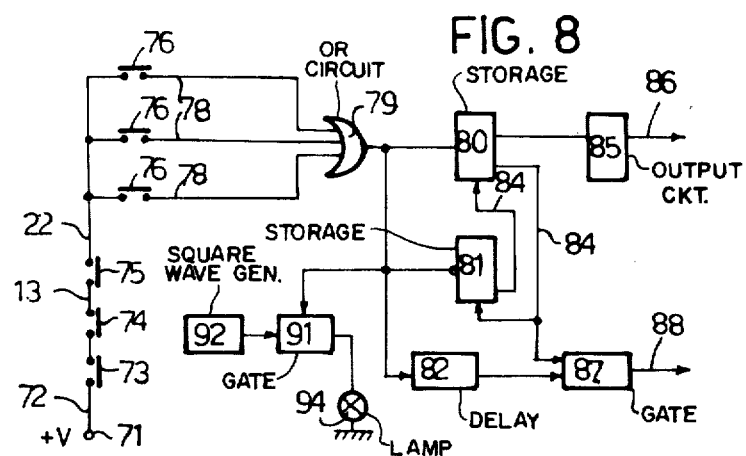
FIG. 8 is a block diagram of the electric circuits of the probe which forms the subject matter of the present invention.

Fixed to the block 33 are a double electrical plug 36 having conveniently five contacts, and a mechanical centering pin 37 disposed vertically and projecting upwards, by half of its length, from the block 33. The block 33 locks, against an inner shoulder 38 of the body 1, a pan 41 in which there are formed an axial hole 42 (see FIG. 5) for the passage of the adjusting screw 31, and two holes 43 for the passage of electric connection wires (not shown) from the electric plug 36, through the cylindrical seating 29, to a signal lamp 94 (shown in FIG. 8) disposed within the cup 28. Disposed below said cup 28 and fastened to the columns 3 is an annular spacer 44, conveniently made of an acrylic resin plastic, which is intended to protect said signal lamp against impacts of the movable block 16. Formed in the intermediate portion of the outer cylindrical body 1 is a through channel 45 for the passage of connection wires 46 from the electrical plug 36 to upper end contacts of a printed circuit formed on an annular cylindrical coating 47, made of an insulating semitransparent material, disposed between the outer lower edge of the body 1 and the outer edge of the fixed block 5 and having substantially the same outer diameter as the cylindrical body 1. The lower end contacts of said printed circuit on the cylindrical coating 47 are connected to the inlet connection 12 and to the outlet connections 14 of the terminal board 11.

On the cylindrical outer body 1, within the threaded opening 2, may conveniently be screwed a threaded end portion 50 (FIG. 7) of a cylindrical extension 51, which also is ground and whose outer diameter is equal to that of the body 1. Formed in said end portion 50 is an inner cylindrical space 52 containing a block 53 in which there is formed a cylindrical seating 56 having substantially the same dimensions as those of the centering pin 37. Also fixed to said block 53 are an electrical plug 57 and, by means of a screw 58, a support terminal board 59 for the miniaturized elements (not shown) of the interface of electrical connection with the measuring machine. The upper end of said terminal board 59 is received in a slot of a block 61 which is disposed within an upper threaded opening 62 of the extension 51 and is locked against the terminal board 59 by means of a ring nut 63 and a counter locking nut 64, which are screwed in said opening 62 and push axially three rubber rings 65.

Fixed to the block 61 are a double electrical plug 66 and a centering pin 67 disposed vertically and projecting by half of its length from the upper side of the block 61. Formed in the block 61 is also a hole 68 for the passage of the electrical connections (not shown) of the plug 66 to the miniaturised elements of the terminal board 59. Analogous electrical connections (not shown) are provided between the elements of said terminal board 59 and the electrical plug 57.

Said miniaturised elements of the interface of electrical connection to the measuring machine, after having been positioned on the terminal board 59 before the introduction into the extension 51, are impregnated with resins according to known sealing techniques, so as to obtain a cylinder whose outer diameter is slightly smaller than the inner diameter of the extension 51, which cylinder is successively introduced into the interior of said extension 51 together with the blocks 53 and 61. Thus, said cylinder with the blocks 53 and 61 is free to rotate within said extension 51. Into the upper threaded opening 62 may then be screwed another threaded end portion of a further cylindrical extension 51 similar to the one which has been described. Alternatively, said cylindrical extension 51 is connected to a head (not shown) of a measuring machine.

The electrical circuits of the probe forming the object of the present invention, which are shown in FIG.

8, comprise a feeding terminal 71 at voltage =V, which is connected, by means of a connection 72 comprising the inlet connection 12 of the terminal board 11, to the series of two contact switches 73 and 74. Said two switches 73 and 74 are formed, respectively, by one ball 8 and the pin 18, and by the same pin 18 and the other ball 8. The switch 74 is then connected by the connection 13 to a contact switch 75 formed by the block 7 and the ball 19. The switch 75 is in turn connected through the connection 22 to three contact switches 76 formed by the ball 20 and by one of the balls 9, respectively.

Said three switches 76 are connected respectively, by means of connections 78, which comprise the outlet connections 14 of the terminal board 11, the connections 46 and the electrical plugs 36 and 57, to a logical adder circuit 79 of the type OR, whose output arrives at respectively complemented inlets of two storage circuits 80 and 81 and at a delay circuit 82. The circuits 80 and 81, which conveniently comprise monostable multivibrators, are realized in such a way as to become activated on mutually opposite wave fronts, do not accept successive signals of the same type for a pre-established period of time and moreover present, each of them, a signal on an outlet connection 84 to lock for a pre-established period of time the operation of the other circuit.

The output of the circuit 80 arrives then at an output circuit 85 capable of forming an output measuring signal 86 of pre-established form and duration (for instance 20 /usec), which is adapted to be supplied to the measuring machine.

The output of the delay circuit 82 which may be constituted for example by means of logical gates, arrives at a gate circuit 87 to which is supplied also, as signal of agreement, the signal coming from the outlet connection 84 of the storage circuit 80. The output of the gate circuit 87 supplies a signal 88 for the machine indicating the condition of closure or opening of the switch of the probe.

The output of the logical circuit 79 of the type OR arrives also, as signal of agreement, to a gate circuit 91, at the inlet of which there arrives a signal from a generator 92 of a square wave at low frequency, for example 4 Hz, and which supplies an output signal for the signal lamp 94.

The signals 86 and 88 arrive then at the measuring machine by means of the electrical connections with the double electrical plug 66, without any outer connection to the cylindrical body 1 and the cylindrical extension 51.

The operation of the described probe according to the present invention is as follows.

When the end of the measuring rod (not shown) connected to the vertical connection rod 24 is not in contact with the surface to be inspected, it is disposed according to the tool axis, for example vertical, in the isostatic balance position determined by the abutment of the movable block 16, under the action of the spring 27, onto the fixed block 5.

Such statically determined balance position is, in fact, defined, according to a mathematically exact model, by the presence of a triple constraint, a double constraint and a simple constraint, which in the present case are obtained by means of a ball 20 which rests on the three balls 9, by means of the pin 18 which rests on the two balls 8, and by means of the ball 19 which rests on the plane block 7.

As the end of the measuring rod comes into contact with the surface to be inspected, it is tilted and/or lifted, and accordingly also the movable block 16 is and/or lifted, allowed to do so by the slots 17 and guided by the columns 3. Said columns 3, besides providing a guide for the movable block 16 towards its stable balance position, provide also an impediment to the rotation of the block 16, for example when a measuring rod is being fixed to the vertical connection rod 24. Therefore, an interruption of at least one of the switches 73, 74, 75 and 76 occurs and the switch of the probe, in its whole, results in being opened, so that at the outlet of the circuit 79 there is a signal of a different type, for example of the type 1.

Accordingly, there is an activation of the circuit 80, which activates the circuit 85 which transmits to the measuring machine the measuring signal 86 and locks for a convenient period of time, for instance 0.1 sec., the circuits 81 and 87. Therefore, within the time of 0.1 sec no influence is exerted in the signal 86 by eventual false closure positions of the switch of the probe.

Therefore, after the time of 0.1 sec has elapsed there is also a transmission of the signal 88 to the machine, giving information about the condition of opening of the switch. In fact, the function of the gate circuit 87 is such that the signal 88 certainly arrives at the machine after the transmission of the signal 86, otherwise anomalous operative situations would arise. The delay circuit 82, instead, has the function of preventing the arrival at the gate circuit 87 of the indication signal from the circuit 79 before the arrival of the agreement signal from the connection 84. The signal at the outlet of the circuit 79 allows, moreover, the transmission of the signal from the generator 92 to the signal lamp 94 which periodically lights and extinguishes.

Successively, when the probe returns into the statically determined balance position, under the action of the spring 27, all the switches 73, 74, 75 and 76 close and accordingly a signal of the type 0 is obtained at the outlet of the circuit 79. Therefore, the circuit 81 is activated and locks for a period of time, for example, of 0.1 sec the operation of the circuit 80; in this way, there is no signal 86 during the succession of openings and closures of the switch of the probe until the condition of stable balance is attained. After the stable balance condition has been in practice attained, there is a transmission to the machine of the signal 88 informing about the condition of the switch.

Said signal of the type 0, by controlling the gate circuit 91, also switches off the input to the signal lamp 94 which, thus, extinguishes again.

The probe described hereinabove, which constitutes the subject matter of the present invention, presents numerous advantages of reliable and exact operation in addition to a not negligible easiness of assembly and to a relatively simple construction. Said probe, having to supply a signal representing a deviation from the balance position, corresponding to the opening of the switch assembly, does not require a strictly coaxial position of the measuring rod with respect to the axis of the probe, so that it is not necessary that the contact points between the various elements of the fixed block 5 and movable block 16 are rigorously situated on the same plane orthogonal to the axis of the probe, within a very narrow field of tolerance; on the other hand, since the position of the movable block 16 with respect to that of the fixed block 5 is statically determined, the repeatability of the movements of the rod of the probe in the three spatial directions, with the required degree of accuracy, is always ensured.

Moreover, the connections between the various elements which form the switches of the fixed block 5 and movable block 16, obtained by means of the printed circuits of the terminal boards 11 and 21, ensure a safe and stable electrical connection.

To the outer body 1 of the probe may then be added, by a very simple assembly, various extensions 51, with or without the miniaturised electronic circuits, in the present case with connections between the connection pins of plugs 57 and 66, in order to increase the penetration characteristics of the measuring machine. The type of inner axial connection of the extreme end of the extension 51 ensures that no outer connection cable will come out through the connection to the head of the measuring machine.

Finally, it is clear that the embodiment described hereinabove of the probe of the present invention is susceptible of modifications and variations both in the shape and in the arrangement of the various components, without departing from the scope of protection of the inventive idea of the invention.

What we claim is:

1. Omnidirectional electronic probe for a contour measuring machine of the type having a displaceable head to which the probe is connected, said probe comprising a rod arranged to come into contact with a surface to be inspected, a movable body connected to said rod, and a fixed body supporting said movable body, said movable body being urged by an elastic force towards said fixed body, said fixed and movable bodies including electric contact elements which provide in combination a switch assembly comprising a plurality of contact switches, said movable body with respect to said fixed body having a unique stable balance position which is statically determined by means of a triple, a double and a simple restraint between said two bodies, all of the contact switches of said switch assembly being closed only for said unique stable balance position.

2. The electronic probe of claim 1, wherein said triple, double and simple restraint is provided, respectively, by means of a first ball fixed to one of said bodies and resting on a tern of balls fixed to the other body, by means of a pin fixed to one of said bodies and resting on a pair of balls fixed to the other body, and by means of a second ball fixed to one of said bodies and resting on a plane surface of the other body.

3. The electronic probe of claim 1, wherein said triple, double and simple restraint between said two bodies provides said electric contact elements.

4. The electronic probe of claim 3, wherein disposed on said fixed and movable bodies are terminal boards of printed circuits which provide electrical connections between said electric contact elements and provide input and output connections for said contact switches.

5. The electronic probe of claim 1, comprising first means for supplying a control signal to said measuring machine at the first opening of a contact switch in said switch assembly and for preventing for a pre-established period of time the transmission of further control signals to said machine, said first means also preventing for said pre-established period of time the transmission of control signals to said measuring machine at and after the first closure of a contact switch in said switch assembly.

6. The electronic probe of claim 5, wherein said first means comprise at least two interconnected storage circuits, one of which becomes activated at said first opening and the other at said first closure, the activation of one of said two storage circuits preventing the other storage circuit from being activated, the activation of each storage circuit persisting for said pre-established period of time, said one storage circuit which becomes activated at said first opening supplying said control signal to said measuring machine.

7. The electronic probe of claim 6, wherein said switch assembly comprises a first group of three contact switches connected in series and determined by said simple and said double restraint, which in turn are connected in series to the input side of a second group of three contact switches connected in parallel and determined ky said triple restraint, the output side of said second group being connected to the input of a logical circuit of the OR type whose output is connected to said two storage circuits.

8. The electronic probe of claim 6, comprising second means for supplying, after a pre-established delay, a second control signal to said measuring machine indicating the state of actuation of said switch assembly, said pre-established delay being such that a new second control signal to said machine from said second means arrives after said control signal from said first means.

9. The electronic probe of claim 8, wherein said second means comprise a delay circuit and a gate circuit, said gate circuit supplying said second control signal in its output and being controlled by the control signal from said one storage circuit which becomes activated at said first opening, said delay circuit receiving a signal from said switch assembly and transmitting the received signal to said gate circuit after the arrival at said gate circuit of said control signal from said one storage circuit.

10. The electronic probe of claim 8, wherein said control signal transmitted to said measuring machine from said one storage circuit is a pulse having a pre-established shape and duration, and wherein said second control signal transmitted by said second means is a signal whose level is a function of the state of actuation of said switch assembly.

11. The electronic probe of claim 5, wherein the probe includes a cylindrical outer body whose upper portion is provided with an opening arranged to contain, fixed therein, a cylindrical upper extension, having the same diameter as said outer body, the coupling between said outer body and said extension comprising an electrical coupling between at least two electrical connection plugs and a mechanical coupling between at least one centering pin and a seating.

12. The electronic probe of claim 11, wherein said extension is provided, in its upper portion, with at least one electrical connection plug and at least one centering pin, for the electrical and mechanical coupling of said extension with one of a head of said measuring machine and another extension having the same outer diameter as said outer body.

13. The electronic probe of claim 11, wherein said fixed body is fastened to said outer body by means of at least three columns, said movable body being provided with slots for the passage of said columns, said columns forming an impediment to the axial rotation of said movable body.

14. The electronic probe of claim 11, wherein said first means are formed of miniaturized electronic circuits and are housed in said cylindrical upper extension.

* * * * *